United States Patent Office 3,065,134
Patented Nov. 20, 1962

3,065,134
CHOLERETIC HYDROXYCYCLOALIPHATIC ACID PROCESS
Jacques Georges Albert Eugène Maillard, Robert Marcel Morin, and Madeleine Marie Monique Bénard, Paris, France, assignors to Société d'Exploitation des Laboratoires Jacques Logeais (S.A.R.L.), Issy-les-Moulineaux, Seine, France, a company of France
No Drawing. Filed July 10, 1958, Ser. No. 747,573
Claims priority, application France Feb. 19, 1958
4 Claims. (Cl. 167—55)

This invention relates to novel synthetic chemical compounds which are hydroxycycloaliphatic acids and salts and esters thereof useful as choleretic agents and to pharmaceutical compositions comprising a vehicle or carrier in which one of said agents is incorporated.

Compounds according to the invention respond to the general formula:

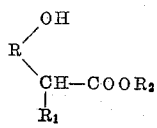

wherein R is selected from the group consisting of cyclohexyl, lower alkyl substituted cyclohexyl and pentyl, $R_1$ is selected from the group consisting of lower alkyl and phenyl, and $R_2$ is selected from the group consisting of hydrogen, alkali metal, alkaline earth metal, ammonium, and alkyl, aralkyl, and cyclic ester groups.

It has not heretofore been possible to produce compounds of the above series in pure crystalline form and in high yields making them useful in human and veterinary medicine as contrasted with crude or impure viscous liquids or compounds obtained in low yields.

Pure crystalline compounds in the form of their acids can be obtained in high yields in two stages by condensing a substituted or unsubstituted cycloaliphatic ketone with an ester of an α-haloaliphatic acid in the presence of zinc, according to the method of Reformatski, and saponifying the ester thus obtained with baryta in a hot hydro-alcoholic medium. Compounds so produced are characterized not only by their pure crystalline form and high yield (73–92% before crystallization and 70–80% after crystallization) but also by their stability and constancy of physico-chemical properties. As far as we are aware, this has not heretofore been possible.

A particularly important compound of the invention is α(hydroxy-1-cyclohexyl) butyric acid and its sodium, ammonium, calcium, diethylamine, piperidine, morpholine and cyclohexylamine salts, the sodium salt being especially outstanding in its choleretic action.

Further exemplary compounds are α(hydroxy-1-cyclohexyl) propionic acid and its alkaline, alkaline earth and organic salts such as the sodium and diethylamine salts; α(hydroxy-1-cyclohexyl) caproic acid and its salts such as the diethylamine salt; α(hydroxy-1-cyclopentyl) butyric acid and its salts; α(hydroxy-1-cyclohexyl) phenyl acetate; and α(hydroxy-1-methyl-4-cyclohexyl) butyric acid and its salts such as the diethylamine salt.

The invention is further illustrated by the following non-limitative examples:

EXAMPLE I (1) α(*Hydroxy-1-Cyclohexyl*) *Butyric Acid*

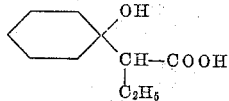

Into a balloon flask with two lateral necks furnished with an efficient mechanical agitator and protected from moisture by a calcium chloride guard, there are introduced 12 grams (0.185 mol) of pure powdered zinc and 20 milliliters of a solution of 16.6 grams (0.17 mol) of anhydrous cyclohexanone and 31.5 grams (0.16 mol) of ethyl α-bromobutyrate in 25 milliliters of anhydrous benzene. With vigorous stirring in a manner to put the zinc into suspension, the balloon flask is gradually heated in an oil bath to 100–105° C. After a few minutes, a reaction starts, causing violent boiling which is maintained while adding the balance of the reactants. Boiling is then continued for one hour. After cooling, the reaction mixture is turned into a beaker containing 30 milliliters of sulfuric acid to half (by volume) with ice. After agitation, the mixture is decanted into a container for separation. The aqueous phase is re-extracted with benzene. The pooled benzene solutions are washed with dilute (10%) cold sulfuric acid, then with cold sodium carbonate (5%) and then with ice water, and dried over anhydrous sodium sulfate. The benzene is evaporated and the ester, which is ethyl α(hydroxy-1-cyclohexyl) butyrate, is distilled off under reduced pressure. The yield obtained was 17 to 19 grams or 49% to 55%. The boiling characteristics of the ester are as follows:

134–135° at 13 mm.
130–132° at 12 mm.
128° at 9 mm.

The ester was saponified with baryta in aqueous methanol as follows:

21.5 grams (0.1 mol) of the above ethyl ester is saponified by boiling under reflux for 4 hours, while agitating, with 30 grams (0.095 mol) of barium oxide hydrated to $8H_2O$ in 250 milliliters of a mixture of equal volumes of methanol and water. After concentration to one-half its volume under reduced pressure and filtration, the aqueous solution is washed with ether and then acidified at 0° C. with 10% hydrochloric acid. The acid liberated in oily form is extracted with ether. The ether is washed with water, dried and evaporated. The yield is 75–80% (14–15 grams of crude acid) which crystallizes spontaneously little by little. It can be crystallized in a mixture of ether and petroleum ether (1:10) or, with better yield, in light gasoline or oil (solubility of the pure acid ranges from 0.3% at 0° C. to 100% at the boiling point). The yield of crystals is 75–80%. The α(hydroxy-1-cyclohexyl) butyric acid thus obtained is a colorless crystalline product with a melting point of 81–82° C., slightly soluble in water and petroleum ether and very soluble in alcohols, acetone, dioxane, chloroform and ether. It is completely soluble in aqueous alkalis at pH 7.5–8.

The reactions may be represented by the following reaction scheme:

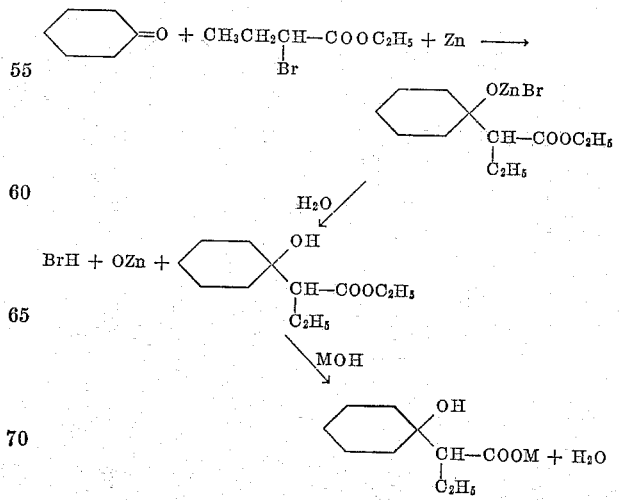

M=Na, K, ½ Ba. H. Instead of $C_2H_5$, $R_2$ may be $CH_3$ or $C_6H_5CH_2$ (2) *Salts of α(Hydroxy-1-Cyclohexyl) Butyric Acid*

The sodium salt

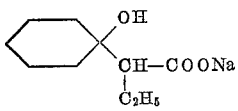

is obtained by neutralization of the acid with an equivalent of NaOH, NaHCO$_3$, or sodium alcoholate in an aqueous or organic solvent. It is a white, crystalline powder, anhydrous and slightly hygroscopic. It has a melting point of 299–300° C. and is extremely soluble in water (pH=7.5–8).

The following additional salts have been prepared by the action of a slight excess of the appropriate anhydrous base on a solution of the acid in anhydrous ether:

Ammonium salt

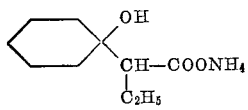

M. Pt.: 125–126° C. N, percent: Found, 6.60; calculated, 6.88

Diethylamine salt

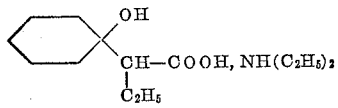

M. Pt.: 98–100° C. (decomp.). N, percent: Found, 5.38; calculated, 5.40

Piperidine salt

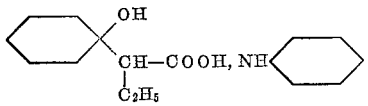

M. Pt.: 100–103° C. (decom.)

Morpholine salt

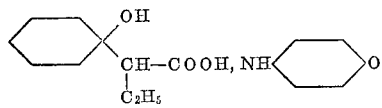

M. Pt.: 98–100° C. (decomp.). N, percent: Found, 5.11; calculated, 5.12

Cyclohexylamine salt

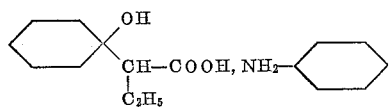

M. Pt.: 148–152° C. (decomp.). N, percent: Found, 4.88: calculated, 490

(1) *α(Hydroxy-1-Cyclohexyl) Propionic Acid* in analogous manner.

EXAMPLE II (1) *α(Hydroxyl-1-Cyclohexyl) Propionic Acid*

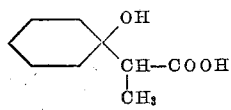

As in Example I, the ethyl ester is first prepared from which the acid and then its salts are formed. The ester is prepared by the reaction:

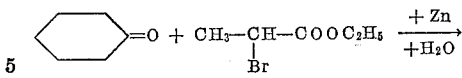

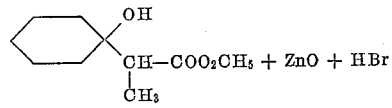

in the following manner:

Into a balloon flask with two lateral necks and provided with mechanical agitation, there are introduced 10.5 grams (0.16 mol) of pure powdered zinc and 30 milliliters of a mixture of 29 grams (0.16 mol) of ethyl α-bromopropionate, 15.8 grams (0.16 mol) of anhydrous cyclohexanone and 80 milliliters of anhydrous benzene. Under strong agitation, the balloon flask is heated on an oil bath to 100–105° C. to initiate the reaction. Boiling is continued for 1 hour after addition of the remainder of the reactants. The product is then further treated as in Example I. The yield obtained was 18 grams or 56%. The ethyl ester distilled over at 120–121° C. at 10 mm.

The ethyl ester was saponified with baryta by the technique described above, giving the corresponding acid in a yield of 92% with a melting point of 55° C. Crystallization was then carried out in the manner described in Example I giving, in an 80% yield, a colorless crystalline product having a melting point of 60–61° C. Its molecular weight, by acidimetry, is 172.5 (calculated molecular weight 172). It has the following carbon and hydrogen content:

C, percent: Found, 62.72; calculated, 62.78. H, percent: Found, 9.28; calculated, 9.30.

The acid is slightly soluble in water and very soluble in most organic solvents and in aqueous alkalis.

(2) *Salts of α(Hydroxy-1-Cyclohexyl) Propionic Acid*

The sodium salt

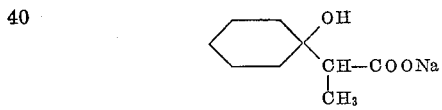

is obtained by neutralization of the acid with an equivalent of NaOH, NaHCO$_3$ or sodium alcoholate in an aqueous or organic solvent. It is a white, hygroscopic, crystalline powder very soluble in water. Its melting point is 275–276° C.

In analogous manner, the diethylamine salt

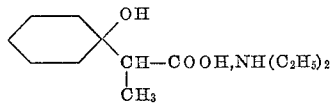

was prepared. Its melting point is 102° C. Its nitrogen content is as follows:

N, percent: Found, 5.71; calculated, 5.70.

EXAMPLE III (1) *α(Hydroxy-1-Cyclohexyl) Caproic Acid*

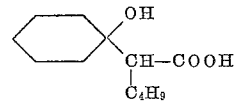

The ethyl ester is prepared in the manner described above for the butyric acid ethyl ester according to the reaction:

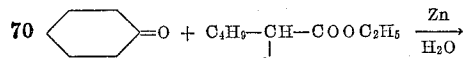

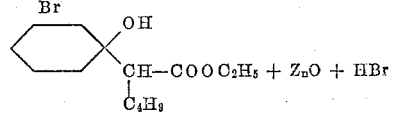

The yield is 56.5% and boiling point 147–148° C. at 10 mm. It has the following carbon and hydrogen analysis:

C, percent: Found, 70.29; calculated, 69.42. H, percent: Found, 11.13; calculated, 10.74.

The ester is saponified with baryta in the manner described in Example I with a yield of 70%. The crude acid thus obtained is crystallized in a mixture of ether and petroleum ether (1:10) and is then in the form of a white crystalline powder with a melting point of 71° C. Its molecular weight, by acidimetry, is 211 (calculated molecular weight 214) and has the following carbon and hydrogen analysis:

C, percent: Found, 67.15; calculated, 67.29. H, percent: Found, 10.62; calculated, 10.28.

(2) *Salts of α(Hydroxy-1-Cyclohexyl) Caproic Acid*

The diethylamine salt

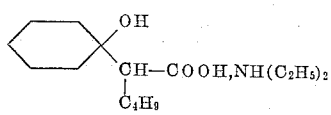

is representative and has a melting point of 125–126° C. Its nitrogen content is:

N, percent: Found, 4.84; calculated, 4.87.

EXAMPLE IV (1) *α(Hydroxy-1-Methyl-3-Cyclohexyl) Butyric Acid*

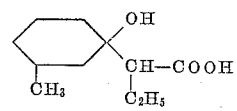

The ethyl ester is prepared in the same general manner as the unsubstituted butyric ester of Example I by the following reaction:

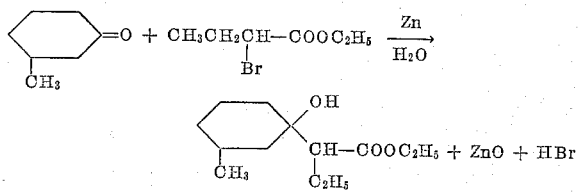

with a yield of 59% and a boiling point of 133–134° C. at 10 mm. It has the following carbon and hydrogen analysis:

C, percent: Found, 68.52; calculated, 68.42. H, percent: Found, 10.59; calculated, 10.52.

The acid is prepared by treating 12.5 grams (0.055 mol) of the ethyl ester under reflux boiling and agitation for 4 hours with 16.5 grams (0.052 mole) of baryta hydrated to 8H₂O in 140 milliliters of a mixture of equal parts, by volume, of methanol and water. After concentration to one-half its volume under reduced pressure and filtration, the aqueous solution is washed with ether, then acidified at 0° C. by 10% hydrochloric acid. The insoluble acid is extracted with ether and the ether washed with water, dried and evaporated to give a yield of 8 grams or 73.5% of crude acid which is crystallized, by the technique described above, in a mixture of ether and petroleum ether (1:10) to give 6 grams of pure acid melting at 85–86° C. Its molecular weight, by acidimetry, is 200 (calculated molecular weight 200) and has the following carbon and hydrogen analysis:

C, percent: Found, 66.37; calculated, 66.00. H, percent: Found, 10.04; calculated, 10.00.

(2) Salts are prepared in the manner described above.

EXAMPLE V (1) *α(Hydroxy-1-Methyl-4-Cyclohexyl) Butyric Acid*

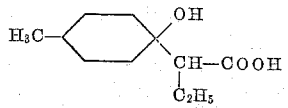

The ethyl ester is prepared by the technique described above according to the reaction:

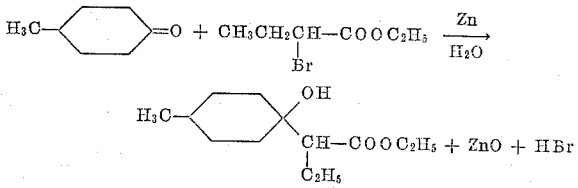

and has a boiling point of 138–139° C. at 12 mm. Its carbon and hydrogen analysis is:

C, percent: Found, 68.51; calculated, 68.42. H, percent: Found, 10.42; calculated, 10.52.

The acid is prepared under the conditions given above for the 3-methyl isomer, 12.5 grams of the ethyl ester giving 10 grams of crude acid (92% yield) and, after crystallization in the above described manner, there results 8 grams of pure acid melting at 96–97° C.

(2) The salts are represented by the diethylamine salt

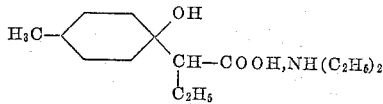

melting at 122–123° C. and containing 5.08% nitrogen (calculated nitrogen percent=5.12).

EXAMPLE VI (1) *α(Hydroxy-1-Cyclopentyl) Butyric Acid*

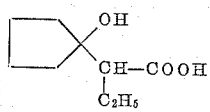

The ethyl ester is prepared, according to the technique described above, from cyclopentanone according to the reaction:

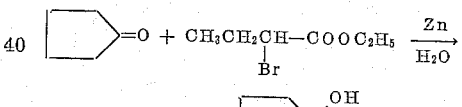

in a yield of 43.5% with a boiling point of 118–120° C. at 15 mm. The ester is saponified with baryta in aqueous methanol by the method described above for the cyclohexyl compounds with a yield of 85% of crude acid which is then crystallized in a mixture of ether and petroleum ether (1:10) to give the acid monohydrate with a melting point of 64–66° C. Its molecular weight, by acidimetry, is 190 for the monohydrate (calculated molecular weight 190). Its carbon and hydrogen analysis is:

C, percent Found, 56.84; calculated, 56.84. H, percent: Found, 9.50; calculated, 9.47.

(2) The sodium and other salts are prepared in a manner analogous to Example I.

EXAMPLE VII (1) *α(Hydroxy-1-Cyclohexyl) α-Phenyl Acetic Acid*

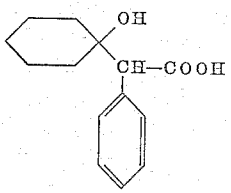

The acid is prepared by the following reaction:

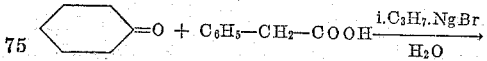

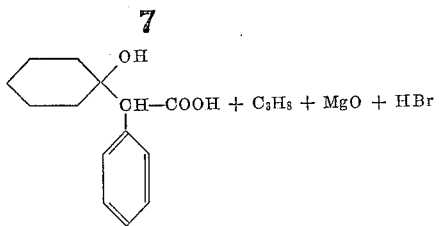

in a yield of 74% with a melting point of 135° C. Its molecular weight, by acidimetry, is 235 and its calculated molecular weight is 234.

(2) The sodium and other salts are prepared in the manner described above.

The foregoing compounds are useful as or in the preparation of choleretic agents and compositions in injectable ampule and tablet form in human and veterinary medicine. The sodium salts are outstanding in their choleretic action and the sodium salt of α(hydroxy-1-cyclohexyl) butyric acid as well as the acid itself has been found to be particularly valuable as it does not act in the manner of a natural bile salt but as a new synthetic substance, well tolerated, free from toxicity and having strong and prolonged choleretic activity with an elevated chemotherapeutic coefficient (about 300). The sodium salt of α(hydroxy-1-cyclohexyl) butyric acid is administered intravenously or intraduodenally in 5 ml. ampules containing 0.50 gram or orally in the form of compressed tablets containing 0.25 gram incorporated in the usual tabletting excipients. Usually 2 ampules are instilled intraduodenally and up to 4 to 6 ampules corresponding to 2 to 3 grams. For intravenous injection, one ampule per day for 12 injections is the regime employed. The tablets are used generally for short periods at the rate of 2 to 4 per day but all dosage forms may be adjusted as to frequency and duration of use depending upon the particular condition being treated until the desired therapeutic results are obtained. The medication is indicated for hepatic dysfunction, hypercholesteremia, familial cholesteremia, infectious hepatitis, pre-cirrhotic conditions and alcoholic cirrhosis, as well as related conditions where it is desired to increase biliary discharge.

As compared with dehydrocholic acid, the sodium salt of α(hydroxy-1-cyclohexyl) butyric acid is about 2.5 times more active and in equitoxic does about 5 times more active and exerts its choleretic action about 2.5 times as long, when the intravenous route if administration is followed. In the intraduodenal route of administration, the intensity and duration of choleretic action are approximately the same as in intravenous administration and likewise exerts choleretic action 2.5 times longer than dehydrocholic acid. By the use of the above sodium compound, the weight of the excreted bile in 4 hours is increased by a factor of 2.05 over normal biliary flow. Due to its diuretic action, the above sodium compound represents a supplemental route for elimination. After administration, there is a latent period of 5 to 10 minutes following which the increased biliary flow commences and lasts for about 4 hours. A 1 gram intraduodenal dose is optimum and intravenous injection produces a volume of excretion at least triple that of intraduodenal administration. The compound has been found in extensive tests to be a true choleretic without cholagogic action and it is not a cholecystokinetic agent.

The invention thus comprises choleretic agents and compositions and parenteral and oral dosage forms thereof as defined by the appended claims.

What is claimed is:

1. The process of treating hepatic diseases which comprises administering to humans and animals requiring increase in biliary discharge a choleretically active composition the essential choleretic agent of which is alph (hydroxy-1-cyclohexyl) butyric acid.

2. A process for treating human hepatic diseases which comprises parenterally administering an aqueous sterile solution of sodium α(hydroxy-1-cyclohexyl) butyrate.

3. A process of treating human hepatic diseases which comprises orally administering tablets containing as active constituent sodium α(hydroxy-1-cyclohexyl) butyrate.

4. The process of treating hepatic diseases which comprises administering to humans and animals requiring increase in biliary discharge a choleretically active composition the essential choleretic agent of which is the sodium salt of α(hydroxy-1-cyclohexyl) butyric acid.

References Cited in the file of this patent

UNITED STATES PATENTS

| | | |
|---|---|---|
| 2,310,937 | Connell | Feb. 16, 1943 |
| 2,535,085 | Moffett et al. | Dec. 26, 1950 |
| 2,538,793 | Moffett et al. | Jan. 23, 1951 |
| 2,554,511 | Treves | May 29, 1951 |
| 2,558,020 | Treves | June 26, 1951 |
| 2,567,873 | Burtner | Sept. 11, 1951 |
| 2,580,402 | Burtner | Jan. 1, 1952 |
| 2,590,085 | Burtner | Mar. 25, 1952 |
| 2,605,207 | Drake et al. | July 29, 1952 |
| 2,770,646 | Treves | Nov. 13, 1956 |
| 2,770,647 | Treves | Nov. 13, 1956 |
| 2,093,396 | Saunders et al. | Sept. 8, 1959 |

FOREIGN PATENTS

| | | |
|---|---|---|
| 760,078 | Great Britain | Oct. 31, 1956 |

OTHER REFERENCES

Kon et al.: J. Chem. Soc. (London), 1927, pages 1536–1546.

Ungnade et al.: J.A.C.S., vol. 70, No. 5, May 1948, pp. 1898–9.

Mousseron et al.: Bull. Soc. Chim. France, 1952, pp. 190–7.

Weston et al.: J.A.C.S., vol. 73, No. 9, September 1951, pp. 4221–3.

Treves et al.: J.A.C.S., vol. 74, No. 1, June 5, 1952, pp. 46–48, esp. Table I, Compounds 1–3.

Blicke et al.: J.A.C.S., vol. 77, No. 20, October 20, 1955, pp. 5399–5405, esp. p. 5402, Table I, Compounds 5, 6 and 7.

Mastagli et al.: Compt. rend., vol. 224, 1947, pp. 1779–81.

Bachman et al.: J. Org. Chem., vol. 13, 1948, pp. 317–328, esp. bottom of p. 323.

Dreiding et al.: J.A.C.S., vol. 75, No. 15, August 5, 1953, pp. 3717–23, esp. p. 3721, rt. hd. col.

Williams: "Detoxication Mechanisms," John Wiley and Sons, Inc., New York, 1947, pages 30–34 ("The Metabolism of Cyclohexane and its Derivatives").

Chemical Abstracts, vol. 51 (1957), No. 3793d, No. 8981h.

Chemical Abstracts, vol. 50 (1956), No. 15942b.

Chem. Abstracts 21, #3186–7 (1927).

Chem. Abstracts 22, #3571(7) (1928).

Chem. Abstracts 24, #76–77 (1930).

Chem. Abstracts 34, #988($^9$) (1940).

Chem. Abstracts 42, #P4606F. (1948).

Chem. Abstracts 44, #1896d (1950).

Chem. Abstracts 44, #6806g (1950).

Chem. Abstracts 52, #13092d (1958).

Chem. Abstracts 52, #18250e–#18251a.

Maillard, Morin and Bénard: "Synthetic Choleretics. Choleretic Properties of Some Cyclo-Aliphatic Acids," Semaine hop., Therapie 33 (9), pages 836–839 (1957).

Maillard, Bénard and Morin: "Cycloaliphatic Acids With Choleretic Activity," Bull. soc. chim. France, pages 244–248, Februray 1958. (Manuscrit reçu le 18 Sept. 1957), April 1, 1958.

Kon and Narayanan: J. Chem. Soc. (1927), pages 1536–1546. (Abstracted in C.A. 21, #3186–7 (1927).)

Kandiah and Lindstead: J. Chem. Soc. (1929), pages 2139–2153. (Abstracted in C.A. 24, #76–77 (1930).)